United States Patent
Kwon et al.

(10) Patent No.: US 10,305,148 B2
(45) Date of Patent: May 28, 2019

(54) CABLE-TYPE SECONDARY BATTERY

(71) Applicant: LG Chem, Ltd., Seoul (KR)

(72) Inventors: Yo-Han Kwon, Daejeon (KR);
Eun-Suk Park, Daejeon (KR);
Je-Young Kim, Daejeon (KR); Se-Woo Yang, Daejeon (KR); Seung-Hyun Chung, Daejeon (KR); Hye-Ran Jung, Daejeon (KR)

(73) Assignee: LG Chem, Ltd. (KR)

(*) Notice: Subject to any disclaimer, the term of this patent is extended or adjusted under 35 U.S.C. 154(b) by 238 days.

(21) Appl. No.: 15/315,519

(22) PCT Filed: Jun. 19, 2015

(86) PCT No.: PCT/KR2015/006251
§ 371 (c)(1),
(2) Date: Dec. 1, 2016

(87) PCT Pub. No.: WO2015/194909
PCT Pub. Date: Dec. 23, 2015

(65) Prior Publication Data
US 2017/0200979 A1   Jul. 13, 2017

(30) Foreign Application Priority Data

Jun. 19, 2014 (KR) .................. 10-2014-0074846
Jun. 18, 2015 (KR) .................. 10-2015-0086822

(51) Int. Cl.
*H01M 10/0587* (2010.01)
*H01M 10/0565* (2010.01)
(Continued)

(52) U.S. Cl.
CPC ..... *H01M 10/0587* (2013.01); *H01M 2/0202* (2013.01); *H01M 4/13* (2013.01);
(Continued)

(58) Field of Classification Search
CPC .......... H01M 10/0565; H01M 10/058; H01M 10/0587; H01M 2002/0205;
(Continued)

(56) References Cited

U.S. PATENT DOCUMENTS

| | | |
|---|---|---|
| 2014/0178726 A1 | 6/2014 | Kwon et al. |
| 2014/0178745 A1 | 6/2014 | Kwon et al. |
| 2014/0234672 A1 | 8/2014 | Kwon et al. |

FOREIGN PATENT DOCUMENTS

| | | |
|---|---|---|
| JP | 2001110445 A | 4/2001 |
| KR | 20130040160 A | 4/2013 |

(Continued)

OTHER PUBLICATIONS

International Search Report from PCT/KR2015/006251, dated Aug. 11, 2015.
(Continued)

*Primary Examiner* — Carlos Barcena
(74) *Attorney, Agent, or Firm* — Lerner, David, Littenberg, Krumholz & Mentlik, LLP

(57) ABSTRACT

The present invention relates to a cable-type secondary battery which can be freely transformed, and more specifically, to a cable-type secondary battery having improved flexibility of the battery by preventing wrinkling, which may occur on a thin metal layer included in packaging. According to the present invention, the flexibility of an electrode can be drastically improved by introducing a support layer on at least one surface of a sheet-type external electrode, and the flexibility of the battery can be improved by forming the support layer, which is the outermost layer of the external electrode, and a polymer resin layer inside the packaging from the same material, and by preventing winkling on the thin metal layer included in the packaging by mutually coupling the support layer and the polymer resin layer.

48 Claims, 8 Drawing Sheets

(51) Int. Cl.
*H01M 4/75* (2006.01)
*H01M 4/13* (2010.01)
*H01M 4/66* (2006.01)
*H01M 2/02* (2006.01)
*H01M 4/131* (2010.01)
*H01M 4/133* (2010.01)
*H01M 4/134* (2010.01)
*H01M 4/62* (2006.01)
*H01M 10/058* (2010.01)
*H01M 4/02* (2006.01)

(52) U.S. Cl.
CPC .......... *H01M 4/131* (2013.01); *H01M 4/133* (2013.01); *H01M 4/134* (2013.01); *H01M 4/625* (2013.01); *H01M 4/66* (2013.01); *H01M 4/661* (2013.01); *H01M 4/75* (2013.01); *H01M 10/058* (2013.01); *H01M 10/0565* (2013.01); *H01M 2002/0205* (2013.01); *H01M 2004/025* (2013.01); *H01M 2220/30* (2013.01); *H01M 2300/0085* (2013.01)

(58) Field of Classification Search
CPC ....... H01M 2004/025; H01M 2220/30; H01M 2300/0085; H01M 2/0202; H01M 4/13; H01M 4/131; H01M 4/133; H01M 4/134; H01M 4/625; H01M 4/66; H01M 4/661; H01M 4/75
See application file for complete search history.

(56) References Cited

FOREIGN PATENT DOCUMENTS

| KR | 20140028723 A | 3/2014 |
| KR | 20140062821 A | 5/2014 |

OTHER PUBLICATIONS

Kwon, Yo Han et al., "Cable-type flexible lithium ion battery based on hollow multi-helix electrodes." Advanced Materials, 2012, vol. 24, No. 38, pp. 5192-5197.

CABLE-TYPE SECONDARY BATTERY

CROSS-REFERENCE TO RELATED APPLICATIONS

This application is a national phase entry under 35 U.S.C. § 371 of International Application No. PCT/KR2015/006251, filed on Jun. 19, 2015, which claims priority to Korean Patent Application Nos. 10-2015-0086822, filed on Jun. 18, 2015 and 10-2014-0074846, filed on Jun. 19, 2014, the disclosures of which are incorporated herein by reference.

TECHNICAL FIELD

The present disclosure relates to a cable-type secondary battery with free shape adaptability, and more particularly, to a cable-type secondary battery with improved battery flexibility by preventing wrinkling that may occur in a metal foil layer included in a packaging.

BACKGROUND ART

A secondary battery is a device that stores electrical energy in chemical form and converts the stored chemical energy into electrical energy to generate electricity when needed. The secondary battery is also referred to as a "rechargeable battery" because it can be recharged repeatedly. A common secondary battery includes a lead accumulator, a NiCd battery, a NiMH accumulator, a Li-ion battery, and a Li-ion polymer battery. When compared to a disposable primary battery, not only is the secondary battery more economically efficient, it is also more environmentally friendly.

Secondary batteries are currently used in applications where low power is needed, for example, devices for assisting in the starting of car engines, mobile devices, tools, and uninterrupted power supply systems. Recent developments in wireless communication technologies have led to the popularization of mobile devices and have brought about a tendency to connect many types of existing devices to wireless networks. Under such circumstances, demand for secondary batteries is growing explosively. Hybrid vehicle and electric vehicle have been put into practical use in the aspect of environmental pollution prevention. These next-generation automobiles reduce in costs and weight and increase in their life span by employing technologies based on secondary batteries.

Generally, most secondary batteries have a cylindrical, prismatic, or pouch shape. This is because the secondary batteries are fabricated by mounting an electrode assembly composed of a negative electrode, a positive electrode and a separator in a cylindrical or prismatic metal can or a pouch-shaped case of an aluminum laminate sheet, and injecting an electrolyte into the electrode assembly. Thus, because a predetermined mounting space for the secondary battery is required, the cylindrical, prismatic or pouch shape of the secondary battery is a limitation in developing various shapes of mobile devices. Accordingly, there is a need for a new type of secondary battery that is easily adaptable in shape.

To fulfill this need, a cable-type secondary battery having a very high ratio of length to cross-sectional diameter has been proposed. A packaging for protecting the cable-type secondary battery requires both flexibility and moisture barrier properties. When a general tube packaging made of polymer is used, moisture or air may permeate through the micropores of the polymer and contaminate an electrolyte in a battery, causing the battery performance to degrade.

To overcome the problem, a packaging formed of a metal foil layer may be used, but due to a stiff property of the metal foil layer itself, in the event that a battery is bent, the battery is not completely bent, and folding or wrinkling occurs on the surface of the metal foil layer, the result being the metal foil layer tearing.

DISCLOSURE

Technical Problem

Therefore, the present disclosure is directed to providing a cable-type secondary battery in which a support layer as an outermost layer of an outer electrode and a polymer resin layer inside a packaging are formed of the same material and they are attached to each other, to prevent winkling of a metal foil layer included in the packaging, thereby improving the flexibility of the battery.

Technical Solution

To achieve the above object, according to an aspect of the present disclosure, there is provided a cable-type secondary battery extending in a lengthwise direction, the cable-type secondary battery including an inner electrode; a separation layer formed around an outer surface of the inner electrode to prevent a short circuit in electrodes; a sheet-type outer electrode formed such that it is spirally wound around an outer surface of the separation layer, and including an outer current collector, an outer electrode active material layer formed on one surface of the outer current collector, and a support layer formed on the other surface of the outer current collector; and a packaging formed around an outer surface of the outer electrode, and including a metal foil layer, a first polymer resin layer formed on one surface of the metal foil layer, and a mechanical support layer formed on the other surface of the metal foil layer, wherein the support layer of the outer electrode and the first polymer resin layer of the packaging are formed of a same material, and attached to one another.

In this instance, the outer electrode may have a strip structure extending in one direction.

Here, the outer electrode may be formed such that it is spirally wound in non-overlapping turns, and in this instance, the outer electrode may be formed such that it is spirally wound in non-overlapping turns, each turn spaced apart with a gap that is twice or less as large as a width of the outer electrode.

Also, the outer electrode may be formed such that it is spirally wound in overlapping turns, and in this instance, the outer electrode may be formed such that it is spirally wound with a width of an overlapping part 0.9 times or less as large as a width of the outer electrode.

On the other hand, the inner electrode may have a hollow structure in which a space is formed inside.

In this instance, an inner electrode current collector core, a lithium ion supplying core including an electrolyte, or a filling core may be formed in the space formed within the inner electrode.

Here, the inner electrode current collector core may be made of carbon nanotubes, stainless steel, aluminum, nickel, titanium, sintered carbon or copper; stainless steel surface-treated with carbon, nickel, titanium or silver; an aluminum-cadmium alloy; a non-conductive polymer surface-treated with a conductive material; or a conductive polymer, the lithium ion supplying core may include a gel-type polymer electrolyte and a support, the lithium ion supplying core may include a liquid electrolyte and a porous carrier, and the filling core may include a polymer resin, rubber, or an inorganic material having a shape of a wire, a fiber, powder, a mesh, or a foam.

On the other hand, the support layer may be a polymer film, and may be formed of any one selected from the group consisting of polyolefin-based resin, polyester-based resin, polyimide-based resin and polyamide-based resin, or mixtures thereof.

On the other hand, the packaging may further include a second polymer resin layer formed on an upper surface of the mechanical support layer.

Also, the metal foil layer may be any one selected from the group consisting of iron (Fe), carbon (C), chrome (Cr), manganese (Mn), nickel (Ni), copper (Cu), aluminum (Al) and equivalents thereof, or alloys thereof.

Also, the first polymer resin layer may be formed of any one selected from the group consisting of polyolefin-based resin, polyester-based resin, polyimide-based resin and polyamide-based resin, or mixtures thereof.

Also, the first polymer resin layer may further include hydrophobic inorganic particles.

In this instance, the hydrophobic inorganic particles may be any one selected from the group consisting of $SiO_2$, $Al_2O_3$, MgO, $BaTiO_3$, $ZrO_2$ and ZnO, or mixtures thereof.

Also, the hydrophobic inorganic particles may have an average particle size of from 1 nm to 5 μm.

On the other hand, the mechanical support layer may be formed of any one selected form the group consisting of high-density polyethylene, low-density polyethylene, linear low-density polyethylene, ultra-high molecular weight polyethylene, polypropylene, polyethyleneterephthalate, polybutyleneterephthalate, polyester, polyacetal, polyamide, polycarbonate, polyimide, polyetheretherketone, polyethersulfone, polyphenyleneoxide, polyphenylenesulfide and polyethylenenaphthalate, or mixtures thereof.

On the other hand, the outer current collector may be a mesh-type current collector.

Also, the outer current collector may be made of stainless steel, aluminum, nickel, titanium, sintered carbon, copper; stainless steel surface-treated with carbon, nickel, titanium or silver; an aluminum-cadmium alloy; a non-conductive polymer surface-treated with a conductive material; a conductive polymer; a metal paste including metal powder of Ni, Al, Au, Ag, Pd/Ag, Cr, Ta, Cu, Ba or indium tin oxide (ITO); or a carbon paste including carbon powder of graphite, carbon black or carbon nanotubes.

On the other hand, according to another aspect of the present disclosure, there is provided a cable-type secondary battery extending in a lengthwise direction, the cable-type secondary battery including a lithium ion supplying core including an electrolyte; an inner electrode including at least one wire-type inner current collector wound around an outer surface of the lithium ion supplying core, and an inner electrode active material layer formed on a surface of the wire-type inner current collector; a separation layer formed around an outer surface of the inner electrode to prevent a short circuit in electrodes; a sheet-type outer electrode formed such that it is wound around an outer surface of the separation layer, and including an outer current collector, an outer electrode active material layer formed on one surface of the outer current collector, a conductive layer formed on an upper surface of the outer electrode active material layer and including a conductive material and a binder, a porous first support layer formed on an upper surface of the conductive layer, and a second support layer formed on the other surface of the outer current collector; and a packaging formed around an outer surface of the outer electrode, and including a metal foil layer, a first polymer resin layer formed on one surface of the metal foil layer, and a mechanical support layer formed on the other surface of the metal foil layer, wherein the second support layer of the outer electrode and the first polymer resin layer of the packaging are formed of a same material, and attached to one another.

Here, the inner electrode may have a structure in which the inner electrode active material layer is formed on an entire surface of the wire-type inner current collector; or a structure in which the inner electrode active material layer is formed around an outer surface of the wound wire-type inner current collector.

Also, the wire-type inner current collector may be made of stainless steel, aluminum, nickel, titanium, sintered carbon, copper; stainless steel surface-treated with carbon, nickel, titanium or silver; an aluminum-cadmium alloy; a non-conductive polymer surface-treated with a conductive material; or a conductive polymer.

In this instance, the conductive material may be any one selected from polyacetylene, polyaniline, polypyrrole, polythiophene, poly sulfur nitride, indium tin oxide (ITO), silver, palladium and nickel, or mixtures thereof.

Also, the conductive polymer may be a polymer which is any one type of compound selected from polyacetylene, polyaniline, polypyrrole, polythiophene and poly sulfur nitride, or mixtures thereof.

On the other hand, the first support layer may be a mesh-type porous membrane or a nonwoven fabric.

Also, the first support layer may be formed of any one selected from the group consisting of high-density polyethylene, low-density polyethylene, linear low-density polyethylene, ultra-high molecular weight polyethylene, polypropylene, polyethyleneterephthalate, polybutyleneterephthalate, polyester, polyacetal, polyamide, polycarbonate, polyimide, polyetheretherketone, polyethersulfone, polyphenyleneoxide, polyphenylenesulfide and polyethylenenaphthalate, or mixtures thereof.

On the other hand, the second support layer may be a polymer film, and may be formed of any one selected from the group consisting of polyolefin-based resin, polyester-based resin, polyimide-based resin and polyamide-based resin, or mixtures thereof.

On the other hand, the conductive layer may be formed by mixing the conductive material and the binder at a weight ratio of from 1:10 to 8:10.

Also, a size of pores formed in the conductive layer may be from 0.01 μm to 5 μm, and porosity may be from 5 to 70%.

Also, the conductive material may include any one selected from the group consisting of carbon black, acetylene black, ketjen black, carbon fibers, carbon nanotubes and graphene, or mixtures thereof.

Also, the binder may be any one selected from the group consisting of polyvinylidene fluoride (PVDF), polyvinylidene fluoride-co-hexafluoro propylene, polyvinylidene fluoride-co-trichloroethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, styrene-butadiene rubber, acrylonitrile-styrene-butadiene copolymer and polyimide, or mixtures thereof.

Also, the electrolyte may include an electrolyte selected from a non-aqueous electrolyte solution using ethylene carbonate (EC), propylene carbonate (PC), butylene carbonate (BC), vinylene carbonate (VC), diethyl carbonate (DEC), dimethyl carbonate (DMC), ethyl methyl carbonate (EMC), methyl formate (MF), γ-butyrolactone (γ-BL), sulfolane, methylacetate (MA), or methylpropionate (MP); a gel-type polymer electrolyte using PEO, PVdF, PVdF-HFP, PMMA, PAN or PVAc; or a solid electrolyte using PEO, polypropylene oxide (PPO), polyethylene imine (PEI), polyethylene sulphide (PES) or polyvinyl acetate (PVAc).

Also, the electrolyte may further include a lithium salt, and in this instance, the lithium salt may be any one selected from LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate and lithium tetraphenylborate, or mixtures thereof.

On the other hand, the inner electrode may be a negative electrode or a positive electrode, and the outer electrode may be a positive electrode or a negative electrode opposing the inner electrode.

Also, in case that the inner electrode is a negative electrode and the outer electrode is a positive electrode, the inner electrode active material layer may include active material particles of any one selected from the group consisting of natural graphite, artificial graphite, a carbonaceous material; lithium-containing titanium composite oxide (LTO), and metals (Me) including Si, Sn, Li, Zn, Mg, Cd, Ce, Ni or Fe; alloys consisting of the metals (Me); oxides (MeOx) of the metals (Me); and composites of the metals (Me) and carbon, or mixtures thereof, and the outer electrode active material layer may include active material particles of any one selected from the group consisting of $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (M1 and M2 are each independently any one selected from the group consisting of Al, Ni, Co, Fe, Mn, V, Cr, Ti, W, Ta, Mg and Mo, and x, y and z are each independently atomic fractions of elements in an oxide composition, in which $0<x<0.5$, $0<y<0.5$, $0<z<0.5$, $x+y+z<1$), or mixtures thereof.

Also, in case that the inner electrode is a positive electrode and the outer electrode is a negative electrode, the inner electrode active material layer may include active material particles of any one selected from the group consisting of $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (M1 and M2 are each independently any one selected from the group consisting of Al, Ni, Co, Fe, Mn, V, Cr, Ti, W, Ta, Mg and Mo, and x, y and z are each independently atomic fractions of elements in an oxide composition, in which $0<x<0.5$, $0<y<0.5$, $0<z<0.5$, $x+y+z<1$), or mixtures thereof, and the outer electrode active material layer may include active material particles of any one selected from the group consisting of natural graphite, artificial graphite, a carbonaceous material; lithium-containing titanium composite oxide (LTO), and metals (Me) including Si, Sn, Li, Zn, Mg, Cd, Ce, Ni or Fe; alloys consisting of the metals (Me); oxides (MeOx) of the metals (Me); and composites of the metals (Me) and carbon, or mixtures thereof.

On the other hand, the separation layer may be an electrolyte layer or a separator.

In this instance, the electrolyte layer may include an electrolyte selected from a gel-type polymer electrolyte using PEO, PVdF, PVdF-HFP, PMMA, PAN or PVAc; and a solid electrolyte using PEO, polypropylene oxide (PPO), polyethylene imine (PEI), polyethylene sulphide (PES) or polyvinyl acetate (PVAc).

Also, the electrolyte layer may further include a lithium salt, and in this instance, the lithium salt may be any one selected from LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate and lithium tetraphenylborate, or mixtures thereof.

On the other hand, the separator may be a porous substrate made of a polyolefin-based polymer selected from the group consisting of ethylene homopolymer, propylene homopolymer, ethylene-butene copolymer, ethylene-hexene copolymer and ethylene-methacrylate copolymer; a porous substrate made of a polymer selected from the group consisting of polyester, polyacetal, polyamide, polycarbonate, polyimide, polyether ether ketone, polyether sulfone, polyphenylene oxide, polyphenylene sulfide and polyethylene naphthalate; or a porous substrate made of a mixture of inorganic particles and a binder polymer.

On the other hand, according to still another embodiment of the present disclosure, there is provided a cable-type secondary battery extending in a lengthwise direction, the cable-type secondary battery including at least two lithium ion supplying cores including an electrolyte; at least two inner electrodes arranged in parallel, and including at least one wire-type inner current collector wound around an outer surface of each lithium ion supplying core, and an inner electrode active material layer formed on a surface of the wire-type inner current collector; a separation layer formed around outer surfaces of the inner electrodes together to prevent a short circuit in electrodes; a sheet-type outer electrode formed such that it is wound around an outer surface of the separation layer, and including an outer current collector, an outer electrode active material layer formed on one surface of the outer current collector, a conductive layer formed on an upper surface of the outer electrode active material layer and including a conductive material and a binder, a porous first support layer formed on an upper surface of the conductive layer, and a second support layer formed on the other surface of the outer current collector; and a packaging formed around an outer surface of the outer electrode, and including a metal foil layer, a first polymer resin layer formed on one surface of the metal foil layer, and a mechanical support layer formed on the other surface of the metal foil layer, wherein the second support layer of the outer electrode and the first polymer resin layer of the packaging are formed of a same material, and attached to one another.

Advantageous Effects

According to the present disclosure, as the support layer is introduced on at least one surface of the sheet-type outer electrode, the flexibility of the battery can be greatly improved.

Also, even though there is no increase in binder content of the electrode active material layer, the support layer acts as a buffer to mitigate cracking in the electrode active material layer, thereby preventing the peel-off of the electrode active material layer from the current collector.

Thereby, capacity reductions of the battery can be prevented, and life characteristics of the battery can be improved.

Also, as the conductive layer is provided on the upper surface of the outer electrode active material layer, the conductivity of the electrode can be increased.

Further, inclusion of the porous support layer achieves smooth feeding of an electrolyte solution into the electrode active material layer, and as the electrolyte solution is impregnated into the pores of the porous support layer, increases in resistance in the battery are prevented, thereby preventing any battery performance degradation.

Also, as the support layer as an outermost layer of the outer electrode and the polymer resin layer inside the packaging are formed of the same material and they are attached to each other, winkling of the metal foil layer included in the packaging is prevented, thereby improving the flexibility of the battery.

BRIEF DESCRIPTION OF THE DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

Figure 1:
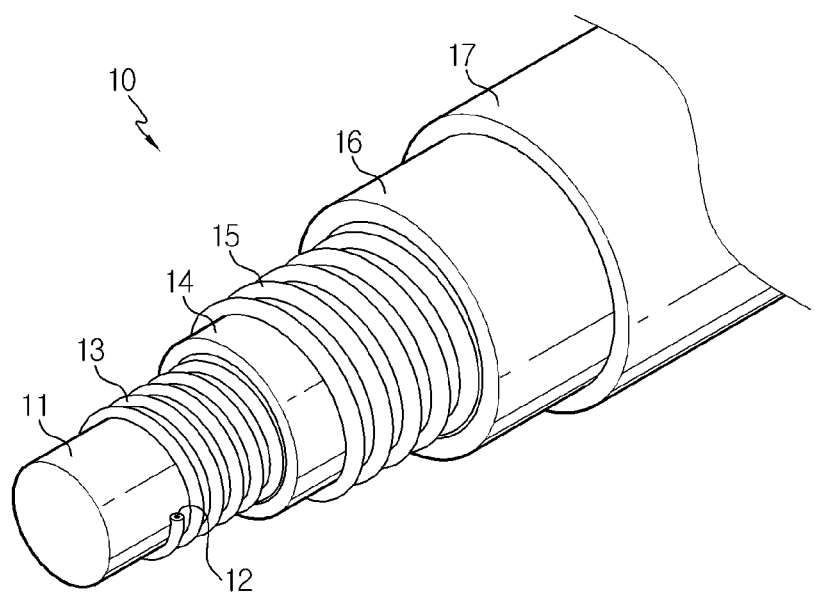
FIG. 1 is an outline exploded perspective view showing a cable-type secondary battery having a wire-type outer current collector according to related art.

DESCRIPTION OF REFERENCE NUMERALS 10, 100, 200, 300: Cable-type secondary battery
11, 110, 210, 310: Lithium ion supplying core
12, 120, 220, 320: Wire-type inner current collector
13, 130, 230, 330: Inner electrode active material layer
14, 140, 240, 340: Separation layer
15, 151, 351: Outer current collector
16, 152, 352: Outer electrode active material layer
17, 160, 260, 360: Packaging
150, 250, 350: Outer electrode
153, 353: Conductive layer
154, 354: First support layer
155, 355: Second support layer
161, 361: Metal foil layer
162, 362: First polymer resin layer
163, 363: Mechanical support layer
164: Second polymer resin layer

MODE FOR CARRYING OUT THE INVENTION

Hereinafter, the present disclosure will be described in detail with reference to the accompanying drawings. It should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the disclosure described herein are just one most preferred embodiment of the present disclosure, not intended to represent all the technical aspects of the present disclosure, so it should be understood that various equivalents and variations as alternatives thereto would be made at the time the present application is filed.

FIG. 1 is a diagram showing a cable-type secondary battery having a wire-type outer current collector according to related art, and FIGS. 2 through 6 are outline diagrams showing a sheet-type outer electrode and a packaging according to an embodiment of the present disclosure and a cable-type secondary battery including them.

Hereinafter, referring to FIGS. 1 through 6, the cable-type secondary battery 10 according to related art is provided with a wound wire-type outer current collector 15 and an outer electrode active material layer 16 formed by dip coating around the outer surface of the wound wire-type outer current collector 15. In this instance, as the outer current collector 15 is made in a wire shape, movements of electrons produced during charging and discharging of the battery are worse than a sheet-type current collector. This is generally because line resistance is higher than sheet resistance, and as a result, the internal resistance of the battery is high, and the battery gets poor at not only rate characteristics but also life characteristics under high rate conditions. Also, because the outer electrode active material layer 16 is formed by dip coating, the shape is protected by a packaging 17 under external bending/twisting conditions, but nevertheless, there is a likelihood that cracks may be generated on the surface of the outer electrode active material layer 16, which is eventually unfavorable in terms of electrode flexibility.

On the other hand, a packaging for protecting a cable-type secondary battery requires flexibility and moisture barrier property at the same time. In case that a general tube packaging of polymer is used, moisture or air may permeate through the micropores of the polymer, and contaminate an electrolyte inside the battery, causing the battery performance to degrade. To solve this problem, a packaging formed of a metal foil layer may be used, but due to a stiff property of the metal foil layer itself, when bent, the battery is not completely bent, and instead, the surface of the metal foil layer is folded or wrinkled, and at the end, the metal foil layer may be torn, and particularly, even though the packaging is skin-tightly formed in a cable-type electrode assembly, a space between the electrode assembly and the packaging is created, failing to fix them, so when the battery is bent, the electrode assembly inside may be damaged by the wrinkles generated on the surface of the metal foil layer.

To solve the problem, a cable-type secondary battery extending in the lengthwise direction according to the present disclosure is provided with an inner electrode; a separation layer formed around the outer surface of the inner electrode to prevent a short circuit in electrodes; a sheet-type outer electrode formed such that it is wound in spiral pattern around the outer surface of the separation layer, and including an outer current collector, and an outer electrode active material layer formed on one surface of the outer current collector and a support layer formed on the other surface of the outer current collector; and a packaging formed around the outer surface of the outer electrode, and including a metal foil layer, a first polymer resin layer formed on one surface of the metal foil layer, and a mechanical support layer formed on the other surface of the metal foil layer, wherein the support layer of the outer electrode and the first polymer resin layer of the packaging are formed of the same material and attached to each other.

Here, the term spiral, also known as a helix, refers to a curve that turns in a twisting shape within a predetermined range, and collectively represents shapes similar to the shape of a general spring.

In this instance, the outer electrode may have a strip structure extending in one direction.

Also, the outer electrode may be spirally wound in non-overlapping turns. In this instance, the outer electrode may be spirally wound in non-overlapping turns, each turn spaced apart with a gap that is twice or less as large as the width of the outer electrode, to prevent any battery performance degradation.

Also, the outer electrode may be spirally wound in overlapping turns. In this instance, to prevent an excessive increase in the internal resistance of the battery, the outer electrode may be spirally wound such that the width of an overlapping part is 0.9 times or less as large as the width of the outer electrode.

On the other hand, the inner electrode may have a hollow structure in which a space is formed inside.

In this instance, in the space formed within the inner electrode, an inner electrode current collector core may be formed.

In this instance, the inner electrode current collector core may be made of carbon nanotubes, stainless steel, aluminum, nickel, titanium, sintered carbon or copper; stainless steel surface-treated with carbon, nickel, titanium or silver; an aluminum-cadmium alloy; a non-conductive polymer surface-treated with a conductive material; or a conductive polymer.

Also, in the space formed within the inner electrode, a lithium ion supplying core including an electrolyte may be formed.

In this instance, the lithium ion supplying core may include a gel-type polymer electrolyte and a support.

Also, the lithium ion supplying core may include a liquid electrolyte and a porous carrier.

Furthermore, in the space formed within the inner electrode, a filling core may be formed.

In addition to materials for forming the inner electrode current collector core and the lithium ion supplying core as described above, the filling core may be formed of materials for improving various aspects of the performance of the cable-type secondary battery, for example, polymer resins, rubbers, and inorganic materials in various shapes such as a wire, a fiber, powder, a mesh, and a foam.

On the other hand, the support layer may be a polymer film, and may be formed of any one selected from the group consisting of polyolefin-based resin, polyester-based resin, polyimide-based resin and polyamide-based resin, or mixtures thereof.

On the other hand, a cable-type secondary battery 100, 200 extending in the lengthwise direction according to another aspect of the present disclosure a lithium ion supplying core 110, 210 including an electrolyte; an inner electrode including at least one wire-type inner current collector 120, 220 formed such that it is wound around the outer surface of the lithium ion supplying core 110, 210 and an inner electrode active material layer 130, 230 formed on the surface of the wire-type inner current collector 120, 220; a separation layer 140, 240 formed around the outer surface of the inner electrode to prevent a short circuit in electrodes; a sheet-type outer electrode 150, 250 formed such that it is wound around the outer surface of the separation layer 140, 240, and including an outer current collector 151, an outer electrode active material layer 152 formed on one surface of the outer current collector 151, a conductive layer 153 formed on the upper surface of the outer electrode active material layer 152 and including a conductive material and a binder, a porous first support layer 154 formed on the upper surface of the conductive layer 153, and a second support layer 155 formed on the other surface of the outer current collector 151; and a packaging 160, 260 formed around the outer surface of the outer electrode 150, 250, and including a metal foil layer 161, a first polymer resin layer 162 formed on one surface of the metal foil layer 161, and a mechanical support layer 163 formed on the other surface of the metal foil layer 161, wherein the second support layer 155 of the outer electrode 150, 250 and the first polymer resin layer 162 of the packaging 160, 260 are formed of the same material and attached to each other.

In this instance, after the packaging 160, 260 is skin-tightly formed on the outer surface of the outer electrode 150, 250, the second support layer 155 and the first polymer resin layer 162 can be attached and fixed by applying heat and pressure on the surface of the cable-type secondary battery 100, 200. Thereby wrinkling of the metal foil layer 161 inside the packaging 160, 260 can be minimized, and further, the flexibility of the cable-type secondary battery can be improved.

Also, the cable-type secondary battery 100, 200 may have a cross section in a predetermined shape, and the predetermined shape is not limited to a particular shape, and any shape that does not detract from the nature of the present disclosure can be contemplated. The cable-type secondary battery 100, 200 of the present disclosure has a cross section in a predetermined shape, and has a linear structure elongating in the lengthwise direction with regard to the cross section, so it has flexibility and thus free shape adaptability.

Here, the metal foil layer 161 may be any one selected from the group consisting of iron (Fe), carbon (C), chrome (Cr), manganese (Mn), nickel (Ni), copper (Cu), aluminum (Al) and equivalents thereof, or alloys thereof. The metal foil layer 161 is not limited to the exemplary group, but when an iron containing material is used for the metal foil layer 1, the mechanical strength increases, and when an aluminum containing material is used, flexibility improves. Preferably, an aluminum metal foil may be used.

Also, the first polymer resin layer 162 may be made of any one selected from the group consisting of polyolefin-based resin, polyester-based resin, polyimide-based resin and polyamide-based resin, or mixtures thereof.

Also, the first polymer resin layer 162 may further include hydrophobic inorganic particles. Examples of the hydrophobic inorganic particles include, but are not limited to, $SiO_2$, $Al_2O_3$, $MgO$, $BaTiO_3$, $ZrO_2$ and $ZnO$. Also, the hydrophobic inorganic particles may have an average particle size of from 1 nm to 5 μm. As the hydrophobic inorganic particles are further included, an insulating effect in the battery can be further improved, and water permeation into the battery is prohibited, minimizing contamination of an electrolyte substance in the battery, thereby preventing any battery performance degradation.

On the other hand, the mechanical support layer 163 may be formed of any one selected from the group consisting of high-density polyethylene, low-density polyethylene, linear low-density polyethylene, ultra-high molecular weight polyethylene, polypropylene, polyethyleneterephthalate, polybutyleneterephthalate, polyester, polyacetal, polyamide, polycarbonate, polyimide, polyetheretherketone, polyethersulfone, polyphenyleneoxide, polyphenylenesulfide and polyethylenenaphthalate, or mixtures thereof.

Figure 5:
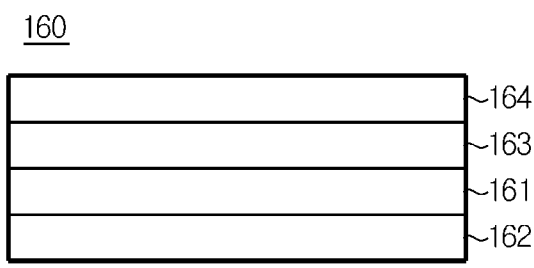
FIG. 5 is an outline cross-sectional view showing a cross section of a packaging according to another embodiment of the present disclosure.

On the other hand, the packaging 160, 260 may further include a second polymer resin layer 164 formed on the upper surface of the mechanical support layer 163 as shown in FIG. 5, and the second polymer resin layer 164 may be formed of the same material as the first polymer resin layer 162.

On the other hand, the inner electrode may have a structure in which the inner electrode active material layer is formed on the entire surface of the wire-type inner current collector; or a structure in which the inner electrode active material layer is formed around the outer surface of the wound wire-type inner current collector.

Figure 2:
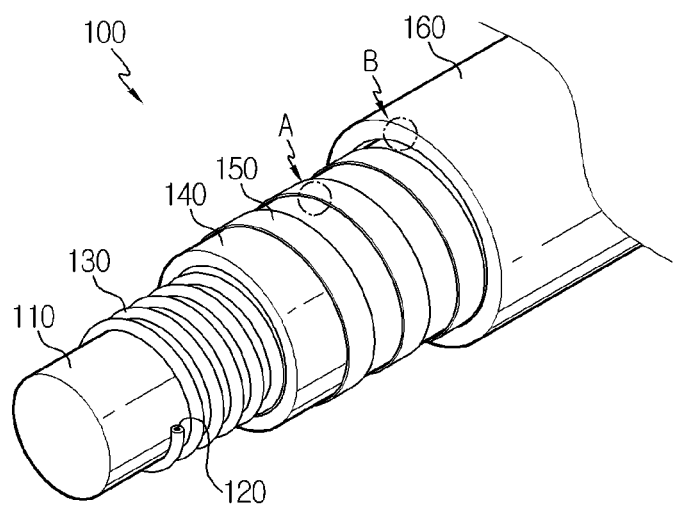
FIG. 2 is an outline exploded perspective view showing a cable-type secondary battery having a sheet-type outer current collector according to an embodiment of the present disclosure.
Figure 3:
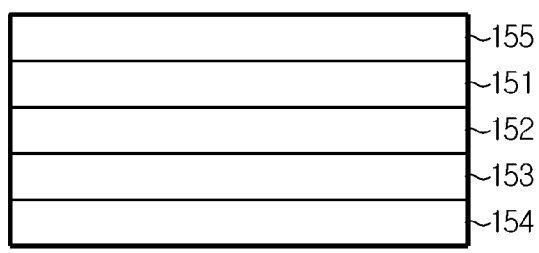
FIG. 3 is an outline cross-sectional view showing a cross section of a sheet-type outer current collector according to an embodiment of the present disclosure.
Figure 4:
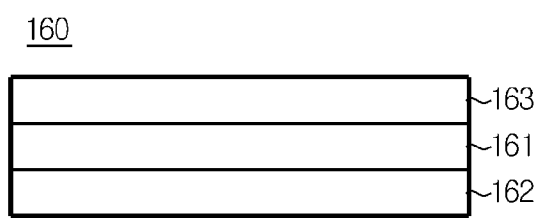
FIG. 4 is an outline cross-sectional view showing a cross section of a packaging according to an embodiment of the present disclosure.
Figure 6:
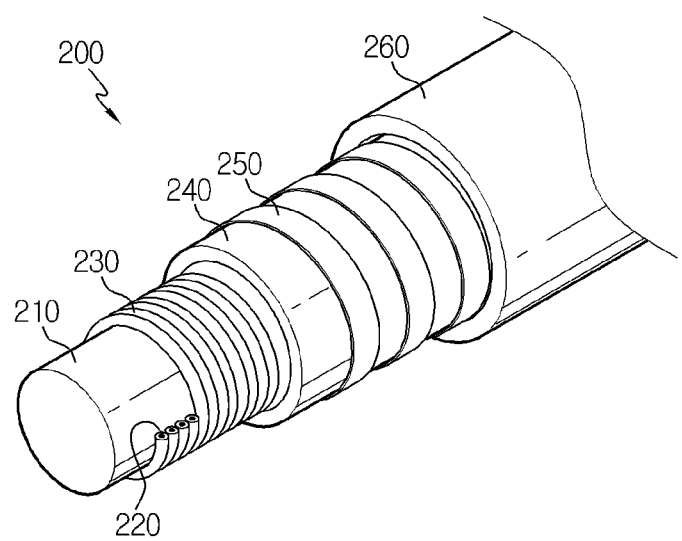
FIG. 6 is an outline exploded perspective view showing a cable-type secondary battery having a sheet-type outer current collector according to another embodiment of the present disclosure.

Among them, in relation to the structure in which the inner electrode active material layer is formed on the entire surface of the wire-type inner current collector, as shown in FIG. 2, before one wire-type inner current collector 120 is wound on the outer surface of the lithium ion supplying core 110, the inner electrode active material layer 130 may be pre-formed on the surface of the wire-type inner current collector 120, and as shown in FIG. 6, at least two wire-type inner current collectors 220 may be cross-wound, the surface on which the inner electrode active material layer 230 is formed. In case that at least two wire-type inner current collectors 220 are wound together, it is advantageous in improving the rate characteristics of the battery.

Also, in relation to the structure in which the inner electrode active material layer is formed around the outer surface of the wound wire-type inner current collector, after the wire-type inner current collector is wound on the outer surface of the lithium ion supplying core, the inner electrode active material layer may be formed around the outer surface of the wound wire-type inner current collector.

On the other hand, the wire-type inner current collector 120, 220 of the present disclosure is preferably made using stainless steel, aluminum, nickel, titanium, sintered carbon, copper; stainless steel surface-treated with carbon, nickel, titanium or silver; an aluminum-cadmium alloy; a non-conductive polymer surface-treated with a conductive material; or a conductive polymer.

The current collector serves to collect electrons generated by electrochemical reactions of an active material or to supply electrons required for electrochemical reactions, and generally uses a metal such as copper or aluminum. Particularly, in case that a polymer conductor made of a non-conductive polymer surface-treated with a conductive material or a conductive polymer is used, flexibility is better than the case using a metal such as copper or aluminum. Also, in place of a metal current collector, the use of a polymer current collector can achieve light weight of the battery.

The conductive material includes polyacetylene, polyaniline, polypyrrole, polythiophene, poly sulfur nitride, indium tin oxide (ITO), silver, palladium, and nickel, and the conductive polymer includes polyacetylene, polyaniline, polypyrrole, polythiophene, and poly sulfur nitride. The non-conductive polymer used for the current collector is not limited to a particular type.

On the other hand, the outer current collector 151 may be a mesh-type current collector, and to further increase the surface area of the current collector, a plurality of recesses may be formed on at least one surface. In this instance, the plurality of recesses may have a continuous pattern or an intermittent pattern. That is, a continuous pattern of recesses arranged in the lengthwise direction, spaced apart from each other, may be formed, or an intermittent pattern of multiple holes may be formed. The plurality of holes may be circular or polygonal in shape.

Also, the outer current collector 151 may be made of stainless steel, aluminum, nickel, titanium, sintered carbon, copper; stainless steel surface-treated with carbon, nickel, titanium or silver; an aluminum-cadmium alloy; a non-conductive polymer surface-treated with a conductive material; a conductive polymer; a metal paste including metal powder of Ni, Al, Au, Ag, Pd/Ag, Cr, Ta, Cu, Ba or indium tin oxide (ITO); or a carbon paste including carbon powder of graphite, carbon black or carbon nanotubes.

On the other hand, the first support layer 154 may be a mesh-type porous membrane or a nonwoven fabric. By having this porous structure, feeding of an electrolyte solution into the outer electrode active material layer 152 made smooth, and the first support layer 154 itself is strongly impregnated with an electrolyte solution, which ensures ion conductivity, thereby preventing the internal resistance of the battery from increasing and preventing any battery performance degradation.

Also, the first support layer 154 may be formed of any one selected from the group consisting of high-density polyethylene, low-density polyethylene, linear low-density polyethylene, ultra-high molecular weight polyethylene, polypropylene, polyethyleneterephthalate, polybutyleneterephthalate, polyester, polyacetal, polyamide, polycarbonate, polyimide, polyetheretherketone, polyethersulfone, polyphenyleneoxide, polyphenylenesulfide and polyethylenenaphthalate, or mixtures thereof.

On the other hand, a conductive coating layer consisting of a conductive material and a binder may be further included on the upper surface of the first support layer 154. The conductive coating layer improves conductivity of the electrode active material layer and reduces the electrode resistance, and as a consequence, prevents any battery performance degradation.

In this instance, for the conductive material and the binder, the same thing as those used for a conductive layer as described later may be used.

For a negative electrode, because conductivity of a negative electrode active material layer is relatively high, a negative electrode with no conductive coating layer shows similar performance to the case where a general negative electrode is used, while for a positive electrode, because conductivity of a positive electrode active material layer is low, performance degradation caused by an increase in the electrode resistance may become more serious, so it is specially advantageous when applied to a positive electrode with an aim to reducing the internal resistance of the battery.

In this instance, the conductive coating layer may include a mixture of the conductive material and the binder at a weight ratio of from 80:20 to 99:1. When the binder content increases, the electrode resistance may excessively increase, while when the content satisfies the numerical range, an excessive increase in the electrode resistance is prevented. Further, because the first support layer serves as a buffer to prevent the peel-off of the electrode active material layer as described above, although the binder is present in a small amount, there is no great difficulty in ensuring the flexibility of the electrode.

On the other hand, the second support layer 155 may be a polymer film, and may be formed of any one selected from the group consisting of polyolefin-based resin, polyester-based resin, polyimide-based resin and polyamide-based resin, or mixtures thereof.

On the other hand, the conductive layer 153 may be formed by mixing the conductive material and the binder at a weight ratio of from 1:10 to 8:10.

In this instance, the conductive layer 153 may be formed with a porous structure to allow for smooth feeding of an electrolyte solution into the electrode active material layer, and in this instance, the size of the pores formed in the conductive layer may be from 0.01 μm to 5 μm, and the porosity may be from 5 to 70%.

Also, the conductive material may include, but is not limited to, any one selected from the group consisting of carbon black, acetylene black, ketjen black, carbon fibers, carbon nanotubes and graphene, or mixtures thereof.

Also, the binder may include, but is not limited to, any one selected from the group consisting of polyvinylidene fluoride (PVDF), polyvinylidene fluoride-co-hexafluoro propylene, polyvinylidene fluoride-co-trichloroethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, styrene-butadiene rubber, acrylonitrile-styrene-butadiene copolymer and polyimide, or mixtures thereof.

On the other hand, the lithium ion supplying core 110, 210 includes an electrolyte, and the electrolyte is not limited to a particular type and may include a non-aqueous electrolyte solution using ethylene carbonate (EC), propylene carbonate (PC), butylene carbonate (BC), vinylene carbonate (VC), diethyl carbonate (DEC), dimethyl carbonate (DMC), ethyl methyl carbonate (EMC), methyl formate (MF), γ-butyrolactone (γ-BL), sulfolane, methylacetate (MA), or methylpropionate (MP); a gel-type polymer electrolyte using PEO, PVdF, PVdF-HFP, PMMA, PAN or PVAc; or a solid electrolyte using PEO, polypropylene oxide (PPO), polyethylene imine (PEI), polyethylene sulphide (PES) or polyvinyl acetate (PVAc). The electrolyte may further include a lithium salt, and the lithium salt preferably includes LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate and lithium tetraphenylborate. Also, the lithium ion supplying core 110, 210 may consist only of an electrolyte, and in the case of a liquid electrolyte solution, the lithium ion supplying core 110, 210 may be formed using a porous carrier.

The inner electrode may be a negative electrode or a positive electrode, and the outer electrode may be a positive electrode or a negative electrode opposing the inner electrode.

The electrode active material layer of the present disclosure acts to move ions through the current collector, and the movements of ions are made by interaction through intercalation of ions from an electrolyte layer and deintercalation of ions to the electrolyte layer.

The electrode active material layer can be classified into a negative electrode active material layer and a positive electrode active material layer.

Specifically, in case that the inner electrode is a negative electrode and the outer electrode is a positive electrode, the inner electrode active material layer may include, as a negative electrode active material, active material particles of any one selected from the group consisting of natural graphite, artificial graphite, a carbonaceous material; lithium-containing titanium composite oxide (LTO), and metals (Me) including Si, Sn, Li, Zn, Mg, Cd, Ce, Ni or Fe; alloys consisting of the metals (Me); oxides (MeOx) of the metals (Me); and composites of the metals (Me) and carbon, or mixtures thereof, and the outer electrode active material layer may include, as a positive electrode active material, active material particles of any one selected from the group consisting of LiCoO$_2$, LiNiO$_2$, LiMn$_2$O$_4$, LiCoPO$_4$, LiFePO$_4$, LiNiMnCoO$_2$ and LiNi$_{1-x-y-z}$Co$_x$M1$_y$M2$_z$O$_2$ (M1 and M2 are each independently any one selected from the group consisting of Al, Ni, Co, Fe, Mn, V, Cr, Ti, W, Ta, Mg and Mo, and x, y and z are each independently atomic fractions of elements in an oxide composition, in which 0<x<0.5, 0<y<0.5, 0<z<0.5, x+y+z≤1), or mixtures thereof.

Also, in case that the inner electrode is a positive electrode and the outer electrode is a negative electrode, the inner electrode active material layer may be a positive electrode active material layer, and the outer electrode active material layer may be a negative electrode active material layer.

The electrode active material layer includes an electrode active material, a binder and a conductive material, and is bonded to the current collector to form an electrode. When the electrode is deformed, for example, bent or severely folded, by external force, the electrode active material may be released. The release of the electrode active material results in reductions in performance and capacity of the battery. However, because the wound sheet-type outer current collector has elasticity, it functions to disperse the applied force when such a deformation occurs by the external force, so the active material layer is less deformed, thus preventing the active material from being released.

For the separation layer 140, 240 of the present disclosure, an electrolyte layer or a separator may be used.

The electrolyte layer which acts as an ion channel may include a gel-type polymer electrolyte using PEO, PVdF, PVdF-HFP, PMMA, PAN or PVAc; or a solid electrolyte using PEO, polypropylene oxide (PPO), polyethylene imine (PEI), polyethylene sulphide (PES) or polyvinyl acetate (PVAc). The matrix of the solid electrolyte preferably comprises a polymer or a ceramic glass as the backbone. In the case of typical polymer electrolytes, ions move very slowly in terms of a reaction rate, even when the ionic conductivity is satisfied. Thus, using the gel-type polymer electrolyte which facilitates the movement of ions is preferable to using the solid electrolyte. The gel-type polymer electrolyte has poor mechanical properties and thus may include a porous support or a cross-linked polymer to improve the poor mechanical properties. The electrolyte layer of the present disclosure can serve as a separator, and thus the use of a separate separator may be eliminated.

The electrolyte layer of the present disclosure may further include a lithium salt. The lithium salt can improve the ionic conductivity and reaction rate, and its non-limiting example includes LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate and lithium tetraphenylborate.

The separator is not limited to a particular type, but may include a porous substrate made of a polyolefin-based polymer selected from the group consisting of ethylene homopolymer, propylene homopolymer, ethylene-butene copolymer, ethylene-hexene copolymer, and ethylene-methacrylate copolymer; a porous substrate made of a polymer selected from the group consisting of polyester, polyacetal, polyamide, polycarbonate, polyimide, polyether ether ketone, polyether sulfone, polyphenylene oxide, polyphenylene sulfide and polyethylene naphthalate; or a porous substrate made of a mixture of inorganic particles and a binder polymer. Particularly, in order for the lithium ions from the lithium ion supplying core to be easily transferred to the outer electrode, it is preferable to use a separator made of a non-woven fabric corresponding to a porous substrate made of a polymer selected from the group consisting of polyester, polyacetal, polyamide, polycarbonate, polyimide, polyether ether ketone, polyether sulfone, polyphenylene oxide, polyphenylene sulfide and polyethylene naphthalate.

Hereinafter, a method for fabricating the cable-type secondary battery according to an embodiment is described in brief with reference to FIGS. 2 through 7.

First, the wire-type inner current collector 120 formed on the surface of the inner electrode active material layer 130 is wound to prepare an inner electrode having an empty space at the center.

A method of forming the inner electrode active material layer 130 on the surface of the wire-type inner current collector 120 may use a general coating process, and specifically, electroplating or anodic oxidation process can be used, but it is preferable to use a process of coating an electrode slurry including an active material using a comma coater or a slot die coater. Also, in the case of the electrode slurry including an active material, dip coating or extrusion coating using an extruder can be employed.

Subsequently, the separation layer 140 sheet is wound and formed on the outer surface of the inner electrode to prevent a short circuit in electrodes.

Subsequently, a sheet-type outer electrode is formed.

More specifically, a sheet-type outer electrode may be made by performing (S1) forming a second support layer on one surface of the sheet-type outer current collector by compression; (S2) applying an outer electrode active material slurry on the other surface of the outer current collector and drying it to form an outer electrode active material layer; (S3) applying a conductive material slurry including a conductive material and a binder on the upper surface of the outer electrode active material layer and forming a porous first support layer on the upper surface of the conductive material slurry; and (S4) compressing a result of the step (S3) to form a conductive layer which is adhered between the outer electrode active material layer and the first support layer to be integrated with each other.

Figure 7:
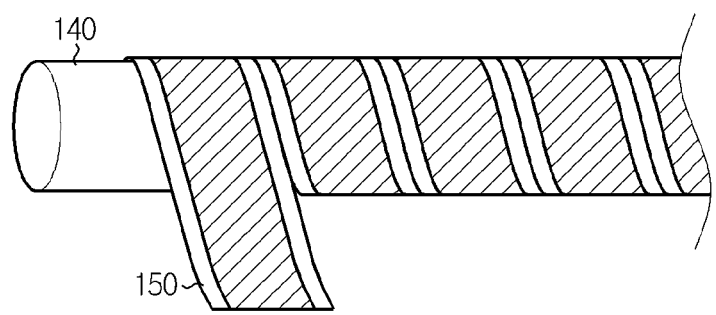
FIG. 7 is an outline diagram showing that a sheet-type outer electrode of the present disclosure is wound on the outer surface of a separation layer.

Subsequently, the sheet-type outer electrode 150 is wound on the outer surface of the separation layer 140 to form an electrode assembly as shown in FIG. 7.

Subsequently, the packaging 160 is formed around the outer surface of the electrode assembly. In this instance, the packaging includes a metal foil layer, a first polymer resin layer formed on one surface of the metal foil layer, and a mechanical support layer formed on the other surface of the metal foil layer, and in this instance, after the packaging 160 is skin-tightly formed on the outer surface of the electrode assembly, the second support layer and the first polymer resin layer are attached and fixed by applying heat and pressure on the surface of the packaging 160.

Subsequently, an electrolyte is injected into the empty space formed at the center of the inner electrode to form the lithium ion supplying core 110.

As described above, the lithium ion supplying core 110 may be formed by injecting an electrolyte solution after forming the packaging 160 on the outer surface of the electrode assembly, but the lithium ion supplying core may be formed by pre-forming a polymer electrolyte in wire shape using an extruder before forming the wound wire-type inner electrode, or may be pre-formed by preparing a wire-type carrier made of sponge and injecting a non-aqueous electrolyte solution therein. Alternatively, after the inner electrode is prepared, the lithium ion supplying core 110 may be formed by injecting a non-aqueous electrolyte solution into the empty space at the center of the inner electrode.

Subsequently, an electrolyte solution feeding part is completely sealed to fabricate a cable-type secondary battery.

Hereinafter, another possible embodiment is described with reference to FIG. 8.

Figure 8:
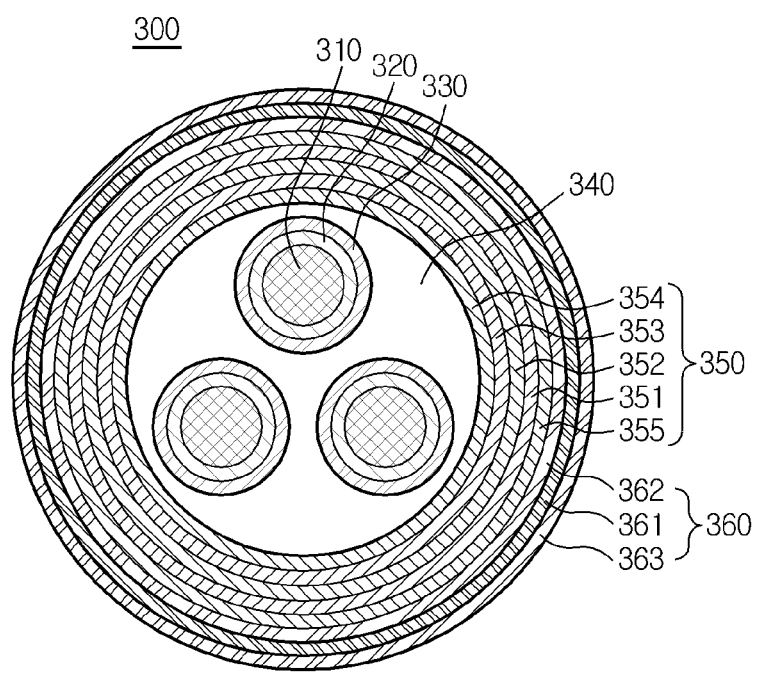
FIG. 8 is a cross-sectional view showing a cross section of a cable-type secondary battery having at least two inner electrodes according to an embodiment of the present disclosure.

Referring to FIG. 8, a cable-type secondary battery 300 of the present disclosure according to an embodiment of the present disclosure is provided with at least two lithium ion supplying cores 310 including an electrolyte; at least two inner electrodes arranged in parallel, and including at least one wire-type inner current collector 320 wound around the outer surface of each lithium ion supplying core 310 and an inner electrode active material layer 330 formed on the surface of the wire-type inner current collector 320; a separation layer 340 formed around the outer surfaces of the inner electrodes together to prevent a short circuit in electrodes; a sheet-type outer electrode 350 formed such that it is wound around the outer surface of the separation layer 340, and including an outer current collector 351, an outer electrode active material layer 352 formed on one surface of the outer current collector 351, a conductive layer 353 formed on the upper surface of the outer electrode active material layer 352, the conductive layer 353 and including a conductive material and a binder, a porous first support layer 354 formed on the upper surface of the conductive layer 353, and a second support layer 355 formed on the other surface of the outer current collector 351; and a packaging 360 formed around the outer surface of the outer electrode 350, and including a metal foil layer 361, a first polymer resin layer 362 formed on one surface of the metal foil layer 361, and a mechanical support layer 363 formed on the other surface of the metal foil layer 361, wherein the second support layer 355 of the outer electrode 350 and the first polymer resin layer 362 of the packaging 360 are formed of the same material and attached to each other.

Because the cable-type secondary battery 300 has the inner electrodes composed of a plurality of electrodes, a loading amount of the electrode active material layer and the battery capacity may be easily controlled by adjusting the number of inner electrodes, and the presence of the plurality of electrodes may prevent a potential short circuit.

On the other hand, the embodiments of the present disclosure disclosed in the specification and the drawings just present a particular example to assist the understanding, but are not intended to limit the scope of the present disclosure. It is obvious to those skilled in the art that in addition to the disclosed embodiments, other variations may be made based on the technical aspects of the present disclosure.

What is claimed is:

1. A cable-type secondary battery extending in a lengthwise direction, the cable-type secondary battery comprising:
   an inner electrode;
   a separation layer formed around an outer surface of the inner electrode to prevent a short circuit in electrodes;
   a sheet-type outer electrode formed such that it is spirally wound around an outer surface of the separation layer, and comprising an outer current collector, an outer electrode active material layer formed on one surface of the outer current collector, and a support layer formed on the other surface of the outer current collector; and
   a packaging formed around an outer surface of the outer electrode, and comprising a metal foil layer, a first polymer resin layer formed on one surface of the metal foil layer, and a mechanical support layer formed on the other surface of the metal foil layer,
   wherein the support layer of the outer electrode and the first polymer resin layer of the packaging are formed of a same material, and attached to one another.

2. The cable-type secondary battery according to claim 1, wherein the outer electrode has a strip structure extending in one direction.

3. The cable-type secondary battery according to claim 2, wherein the outer electrode is formed such that it is spirally wound in non-overlapping turns.

4. The cable-type secondary battery according to claim 3, wherein the outer electrode is formed such that it is spirally wound in non-overlapping turns, each turn spaced apart with a gap that is twice or less as large as a width of the outer electrode.

5. The cable-type secondary battery according to claim 2, wherein the outer electrode is formed such that it is spirally wound in overlapping turns.

6. The cable-type secondary battery according to claim 5, wherein the outer electrode is formed such that it is spirally wound with a width of an overlapping part 0.9 times or less as large as a width of the outer electrode.

7. The cable-type secondary battery according to claim 1, wherein the inner electrode has a hollow structure in which a space is formed inside.

8. The cable-type secondary battery according to claim 7, wherein an inner electrode current collector core, a lithium ion supplying core comprising an electrolyte, or a filling core is formed in the space formed within the inner electrode.

9. The cable-type secondary battery according to claim 8, wherein the inner electrode current collector core is made of carbon nanotubes, stainless steel, aluminum, nickel, titanium, sintered carbon or copper; stainless steel surface-treated with carbon, nickel, titanium or silver; an aluminum-cadmium alloy; a non-conductive polymer surface-treated with a conductive material; or a conductive polymer.

10. The cable-type secondary battery according to claim 8, wherein the lithium ion supplying core comprises a gel-type polymer electrolyte and a support.

11. The cable-type secondary battery according to claim 8, wherein the lithium ion supplying core comprises a liquid electrolyte and a porous carrier.

12. The cable-type secondary battery according to claim 8, wherein the filling core comprises a polymer resin, rubber, or an inorganic material having a shape of a wire, a fiber, powder, a mesh, or a foam.

13. The cable-type secondary battery according to claim 1, wherein the support layer is a polymer film.

14. The cable-type secondary battery according to claim 1, wherein the support layer is formed of any one selected from the group consisting of polyolefin-based resin, polyester-based resin, polyimide-based resin and polyamide-based resin, or mixtures thereof.

15. The cable-type secondary battery according to claim 1, wherein the packaging further comprises a second polymer resin layer formed on an upper surface of the mechanical support layer.

16. The cable-type secondary battery according to claim 1, wherein the metal foil layer is any one selected from the group consisting of iron (Fe), carbon (C), chrome (Cr), manganese (Mn), nickel (Ni), copper (Cu), aluminum (Al) and equivalents thereof, or alloys thereof.

17. The cable-type secondary battery according to claim 1, wherein the first polymer resin layer is formed of any one selected from the group consisting of polyolefin-based resin, polyester-based resin, polyimide-based resin and polyamide-based resin, or mixtures thereof.

18. The cable-type secondary battery according to claim 1, wherein the first polymer resin layer further comprises hydrophobic inorganic particles.

19. The cable-type secondary battery according to claim 18, wherein the hydrophobic inorganic particles are any one selected from the group consisting of $SiO_2$, $Al_2O_3$, MgO, $BaTiO_3$, $ZrO_2$ and ZnO, or mixtures thereof.

20. The cable-type secondary battery according to claim 18, wherein the hydrophobic inorganic particles have an average particle size of from 1 nm to 5 μm.

21. The cable-type secondary battery according to claim 1, wherein the mechanical support layer is formed of any one selected form the group consisting of high-density polyethylene, low-density polyethylene, linear low-density polyethylene, ultra-high molecular weight polyethylene, polypropylene, polyethyleneterephthalate, polybutyleneterephthalate, polyester, polyacetal, polyamide, polycarbonate, polyimide, polyetheretherketone, polyethersulfone, polyphenyleneoxide, polyphenylenesulfide and polyethylenenaphthalate, or mixtures thereof.

22. The cable-type secondary battery according to claim 1, wherein the outer current collector is a mesh-type current collector.

23. The cable-type secondary battery according to claim 1, wherein the outer current collector is made of stainless steel, aluminum, nickel, titanium, sintered carbon, copper; stainless steel surface-treated with carbon, nickel, titanium or silver; an aluminum-cadmium alloy; a non-conductive polymer surface-treated with a conductive material; a conductive polymer; a metal paste including metal powder of Ni, Al, Au, Ag, Pd/Ag, Cr, Ta, Cu, Ba or indium tin oxide (ITO); or a carbon paste including carbon powder of graphite, carbon black or carbon nanotubes.

24. A cable-type secondary battery extending in a lengthwise direction, the cable-type secondary battery comprising:
   a lithium ion supplying core comprising an electrolyte;
   an inner electrode comprising at least one wire-type inner current collector wound around an outer surface of the lithium ion supplying core, and an inner electrode active material layer formed on a surface of the wire-type inner current collector;
   a separation layer formed around an outer surface of the inner electrode to prevent a short circuit in electrodes;
   a sheet-type outer electrode formed such that it is wound around an outer surface of the separation layer, and comprising an outer current collector, an outer electrode active material layer formed on one surface of the outer current collector, a conductive layer formed on an upper surface of the outer electrode active material layer and comprising a conductive material and a binder, a porous first support layer formed on an upper surface of the conductive layer, and a second support layer formed on the other surface of the outer current collector; and a packaging formed around an outer surface of the outer electrode, and comprising a metal foil layer, a first polymer resin layer formed on one surface of the metal foil layer, and a mechanical support layer formed on the other surface of the metal foil layer, wherein the second support layer of the outer electrode and the first polymer resin layer of the packaging are formed of a same material, and attached to one another.

25. The cable-type secondary battery according to claim 24, wherein the inner electrode has a structure in which the inner electrode active material layer is formed on an entire surface of the wire-type inner current collector; or a structure in which the inner electrode active material layer is formed around an outer surface of the wound wire-type inner current collector.

26. The cable-type secondary battery according to claim 24, wherein the wire-type inner current collector is made of stainless steel, aluminum, nickel, titanium, sintered carbon, copper; stainless steel surface-treated with carbon, nickel, titanium or silver; an aluminum-cadmium alloy; a non-conductive polymer surface-treated with a conductive material; or a conductive polymer.

27. The cable-type secondary battery according to claim 26, wherein the conductive material is any one selected from polyacetylene, polyaniline, polypyrrole, polythiophene, poly sulfur nitride, indium tin oxide (ITO), silver, palladium and nickel, or mixtures thereof.

28. The cable-type secondary battery according to claim 26, wherein the conductive polymer is a polymer which is any one type of compound selected from polyacetylene, polyaniline, polypyrrole, polythiophene and poly sulfur nitride, or mixtures thereof.

29. The cable-type secondary battery according to claim 24, wherein the first support layer is a mesh-type porous membrane or a nonwoven fabric.

30. The cable-type secondary battery according to claim 24, wherein the first support layer is formed of any one selected from the group consisting of high-density polyethylene, low-density polyethylene, linear low-density polyethylene, ultra-high molecular weight polyethylene, polypropylene, polyethyleneterephthalate, polybutyleneterephthalate, polyester, polyacetal, polyamide, polycarbonate, polyimide, polyetheretherketone, polyethersulfone, polyphenyleneoxide, polyphenylenesulfide and polyethylenenaphthalate, or mixtures thereof.

31. The cable-type secondary battery according to claim 24, wherein the second support layer is a polymer film.

32. The cable-type secondary battery according to claim 24, wherein the second support layer is formed of any one selected from the group consisting of polyolefin-based resin, polyester-based resin, polyimide-based resin and polyamide-based resin, or mixtures thereof.

33. The cable-type secondary battery according to claim 24, wherein the conductive layer is formed by mixing the conductive material and the binder at a weight ratio of from 1:10 to 8:10.

34. The cable-type secondary battery according to claim 24, wherein a size of pores formed in the conductive layer is from 0.01 μm to 5 μm, and porosity is from 5 to 70%.

35. The cable-type secondary battery according to claim 24, wherein the conductive material includes any one selected from the group consisting of carbon black, acetylene black, ketjen black, carbon fibers, carbon nanotubes and graphene, or mixtures thereof.

36. The cable-type secondary battery according to claim 24, wherein the binder is any one selected from the group consisting of polyvinylidene fluoride (PVDF), polyvinylidene fluoride-co-hexafluoro propylene, polyvinylidene fluoride-co-trichloroethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, styrene-butadiene rubber, acrylonitrile-styrene-butadiene copolymer and polyimide, or mixtures thereof.

37. The cable-type secondary battery according to claim 24, wherein the electrolyte includes an electrolyte selected from a non-aqueous electrolyte solution using ethylene carbonate (EC), propylene carbonate (PC), butylene carbonate (BC), vinylene carbonate (VC), diethyl carbonate (DEC), dimethyl carbonate (DMC), ethyl methyl carbonate (EMC), methyl formate (MF), γ-butyrolactone (γ-BL), sulfolane, methylacetate (MA), or methylpropionate (MP); a gel-type polymer electrolyte using PEO, PVdF, PVdF-HFP, PMMA, PAN or PVAc; or a solid electrolyte using PEO, polypropylene oxide (PPO), polyethylene imine (PEI), polyethylene sulphide (PES) or polyvinyl acetate (PVAc).

38. The cable-type secondary battery according to claim 24, wherein the electrolyte further comprises a lithium salt.

39. The cable-type secondary battery according to claim 38, wherein the lithium salt is any one selected from LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate and lithium tetraphenylborate, or mixtures thereof.

40. The cable-type secondary battery according to claim 24, wherein the inner electrode is a negative electrode or a positive electrode, and the outer electrode is a positive electrode or a negative electrode opposing the inner electrode.

41. The cable-type secondary battery according to claim 24, wherein in case that the inner electrode is a negative electrode and the outer electrode is a positive electrode, the inner electrode active material layer comprises active material particles of any one selected from the group consisting of natural graphite, artificial graphite, a carbonaceous material; lithium-containing titanium composite oxide (LTO), and metals (Me) including Si, Sn, Li, Zn, Mg, Cd, Ce, Ni or Fe; alloys consisting of the metals (Me); oxides (MeOx) of the metals (Me); and composites of the metals (Me) and carbon, or mixtures thereof, and the outer electrode active material layer comprises active material particles of any one selected from the group consisting of LiCoO$_2$, LiNiO$_2$, LiMn$_2$O$_4$, LiCoPO$_4$, LiFePO$_4$, LiNiMnCoO$_2$ and LiNi$_{1-x-y-z}$Co$_x$M1$_y$M2$_z$O$_2$ (M1 and M2 are each independently any one selected from the group consisting of Al, Ni, Co, Fe, Mn, V, Cr, Ti, W, Ta, Mg and Mo, and x, y and z are each independently atomic fractions of elements in an oxide composition, in which 0<x<0.5, 0<y<0.5, 0<z<0.5, x+y+z≤1), or mixtures thereof.

42. The cable-type secondary battery according to claim 24, wherein in case that the inner electrode is a positive electrode and the outer electrode is a negative electrode, the inner electrode active material layer comprises active material particles of any one selected from the group consisting of LiCoO$_2$, LiNiO$_2$, LiMn$_2$O$_4$, LiCoPO$_4$, LiFePO$_4$, LiNiMnCoO$_2$ and LiNi$_{1-x-y-z}$Co$_x$M1$_y$M2$_z$O$_2$ (M1 and M2 are each independently any one selected from the group consisting of Al, Ni, Co, Fe, Mn, V, Cr, Ti, W, Ta, Mg and Mo, and x, y and z are each independently atomic fractions of elements in an oxide composition, in which 0<x<0.5, 0<y<0.5, 0<z<0.5, x+y+z≤1), or mixtures thereof, and the outer electrode active material layer comprises active material particles of any one selected from the group consisting of natural graphite, artificial graphite, a carbonaceous material; lithium-containing titanium composite oxide (LTO), and metals (Me) including Si, Sn, Li, Zn, Mg, Cd, Ce, Ni or Fe; alloys consisting of the metals (Me); oxides (MeOx) of the metals (Me); and composites of the metals (Me) and carbon, or mixtures thereof.

43. The cable-type secondary battery according to claim 24, wherein the separation layer is an electrolyte layer or a separator.

44. The cable-type secondary battery according to claim 43, wherein the electrolyte layer comprises an electrolyte selected from:

a gel-type polymer electrolyte using PEO, PVdF, PVdF-HFP, PMMA, PAN or PVAc; and a solid electrolyte using PEO, polypropylene oxide (PPO), polyethylene imine (PEI), polyethylene sulphide (PES) or polyvinyl acetate (PVAc).

45. The cable-type secondary battery according to claim 43, wherein the electrolyte layer further comprises a lithium salt.

46. The cable-type secondary battery according to claim 45, wherein the lithium salt is any one selected from LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate and lithium tetraphenylborate, or mixtures thereof.

47. The cable-type secondary battery according to claim 43, wherein the separator is a porous substrate made of a polyolefin-based polymer selected from the group consisting of ethylene homopolymer, propylene homopolymer, ethylene-butene copolymer, ethylene-hexene copolymer and ethylene-methacrylate copolymer; a porous substrate made of a polymer selected from the group consisting of polyester, polyacetal, polyamide, polycarbonate, polyimide, polyether ether ketone, polyether sulfone, polyphenylene oxide, polyphenylene sulfide and polyethylene naphthalate; or a porous substrate made of a mixture of inorganic particles and a binder polymer.

48. A cable-type secondary battery extending in a lengthwise direction, the cable-type secondary battery comprising:

at least two lithium ion supplying cores comprising an electrolyte;

at least two inner electrodes arranged in parallel, and comprising at least one wire-type inner current collector wound around an outer surface of each lithium ion supplying core, and an inner electrode active material layer formed on a surface of the wire-type inner current collector;

a separation layer formed around outer surfaces of the inner electrodes together to prevent a short circuit in electrodes;

a sheet-type outer electrode formed such that it is wound around an outer surface of the separation layer, and comprising an outer current collector, an outer electrode active material layer formed on one surface of the outer current collector, a conductive layer formed on an upper surface of the outer electrode active material layer and comprising a conductive material and a binder, a porous first support layer formed on an upper surface of the conductive layer, and a second support layer formed on the other surface of the outer current collector; and a packaging formed around an outer surface of the outer electrode, and comprising a metal foil layer, a first polymer resin layer formed on one surface of the metal foil layer, and a mechanical support layer formed on the other surface of the metal foil layer, wherein the second support layer of the outer electrode and the first polymer resin layer of the packaging are formed of a same material, and attached to one another.

* * * * *